Patented Feb. 11, 1947

2,415,786

UNITED STATES PATENT OFFICE 2,415,786

UNSYMMETRICALLY SUBSTITUTED PIPERAZINES

Johannes S. Buck, East Greenbush, and Richard Baltzly, New York, N. Y., assignors to Burroughs Wellcome & Co. (U. S. A.) Inc., New York, N. Y., a corporation of New York No Drawing. Application January 6, 1944, Serial No. 517,224

9 Claims. (Cl. 260—268)

This invention relates to N-monosubstituted and N-N'-unsymmetrically disubstituted piperazines and has for an object to provide new compositions of the above type and a novel and improved method of making the same.

Another object is to provide a method of making and isolating the above substances which is suitable for commercial operation.

In our copending application Serial No. 476,914, filed February 24, 1943, of which the present application is a continuation in part and in our copending application Serial No. 517,225, filed January 6, 1944, which is also a continuation in part, we have described certain methods for making and isolating substituted piperazines of the type

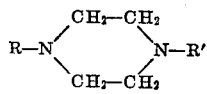

where R is an aralkyl, or a higher alkyl, and R' is either hydrogen or a second radical different from R.

The present invention refers to a new and different process for making any of the above compounds, which new process can also be used for the production of numerous mono-N-substituted and unsymmetrically N,N'-disubstituted piperazines, many of which are not obtainable at all by any of the processes described in our above mentioned copending applications, nor by any of the methods known in the art.

The main difficulty involved in preparing monosubstituted piperazines, from which unsymmetrically disubstituted derivatives can also be obtained, resides in the isolation of the substance from the unreacted piperazine and the disubstituted piperazine which are present and which in many cases have similar boiling points. Amines are extremely hard to separate by fractional distillation unless their boiling points are widely separated. Furthermore, the classical methods of separating secondary from tertiary amines are of no avail in this case, since a monosubstituted piperazine reacts as both a secondary and a tertiary amine. Even where a mixture containing mono- and symmetrically disubstituted piperazines of widely different boiling points or solubilities is formed, the separation of the monosubstituted compounds from the disubstituted reaction products and the unreacted piperazine is frequently difficult or even impossible if the stability of the introduced substituent is insufficient to withstand the conventional separation methods such as fractional distillation.

According to the present invention, these difficulties are overcome by treating piperazine with a halide of benzyl or of a substituted benzyl to form a reaction mixture containing, in addition to unreacted piperazine and di-N-N'- substituted piperazine, a substantial amount of N-mono substituted piperazine separating the mono-N-substituted piperazine from the unreacted piperazine and the disubstituted piperazine, introducing the desired substituent on to the second N' nitrogen atom of the mono-N-substituted piperazine, then removing the benzyl or substituted benzyl group by catalytic hydrogenation.

As catalysts for this hydrogenation, platinum, palladium and nickel are all suitable, but we prefer in general to use palladium since, while equally or perhaps more effective in removing a benzyl group, it is practically devoid of any tendency to reduce aromatic rings.

The term benzyl derivatives as used in the present specification and claims, includes the halogen derivatives such as p-chlorobenzyl and organic derivatives such as anisyl $$(CH_3O.C_6H_4.CH_2\text{—})$$

4-phenyl-benzyl or alpha-menaphthyl (alpha-naphthyl-methyl).

The method according to the present invention permits the preparation of numerous mono-alkyl, mono-acyl and other monosubstituted piperazines with a very high yield.

A particular advantages of the process according to the invention is that it is possible to obtain monosubstituted piperazines of the type

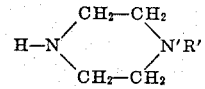

in which R' is a radical, such as a lower alkyl having less than 8 carbon atoms, which when introduced into unreacted piperazine will not produce a separable mixture of mono- and disubstituted compounds, or a radical such as an acyl, an aryl sulfonyl or a substituted aryl sulfonyl, which will produce such separable mixtures only under certain conditions, or a radical of relatively small inherent stability such as acyloxyalkyl, hydroxyphenalkyl, carbamido, substituted carbamido and carbamidino.

From the mono-N' substituted piperazines obtained in this manner, unsymmetrically disubstituted piperazines of any desired type may be obtained by introducing on to the first N nitrogen atom made available by the preceding catalytic hydrogenation, the desired substituent which is different from the substituent present in the monosubstituted compound but may be selected from the same group.

Thus, it is possible to produce unsymmetrically N—R, N'-R'-disubstituted piperazines where R represents a radical selected from the group consisting of the lower alkyls having less than 8 carbon atoms, acyl, aryl sulfonyl, substituted aryl sulfonyl, acyloxyalkyl and hydroxyphenalkyl and R' represents a radical selected from the group consisting of the lower alkyls having less than 8 carbon atoms, acyl, aryl sulfonyl, substituted aryl sulfonyl, acyloxyalkyl, phenacyl, substituted phenacyl, hydroxyphenalkyl, carbamido, substituted carbamido, thiocarbamido, substituted thiocarbamido and carbamidino.

The following examples may serve to illustrate, without limiting the invention.

*Example 1*

Piperazine hexahydrate was dissolved in absolute ethanol and benzyl chloride added with stirring. After standing overnight the alcohol was distilled off and the residue partitioned between ether and sodium hydroxide solution. The greater part of the unreacted piperazine remained in the aqueous layer. The ethereal layer was dried over $K_2CO_3$ and distilled in vacuo to separate pure monobenzyl piperazine from the dibenzyl piperazine.

The monobenzyl piperazine was methylated by the procedure of Clarke, Gillespie and Weisshauss (J. Amber. Chem. Soc., 55, 4571 (1933)), and the product, after liberation of the base was treated with benzoyl chloride to remove any monobenzyl piperazine that had remained unreacted. Basic material was again liberated with alkali and distilled in vacuo. The product, N-benzyl-N'-methyl piperazine, was crystallized as the dihydrochloride from absolute alcohol-ether mixture and this dihydrochloride was hydrogenated catalytically in glacial acetic acid with the aid of palladized-charcoal. After filtration from the catalyst and evaporation of the solution in vacuo, the product, mono-N-methyl piperazine dihydrochloride was crystallized from methanol-ether.

*Example 2*

Piperazine hexahydrate was treated in absolute alcohol with p-chlorobenzyl chloride and the mono-N-p-chlorobenzyl piperazine was separated from the unreacted piperazine and from disubstituted piperazine by fractional distillation.

The mono-p-chloro-benzyl piperazine was reacted with ethyl bromide to yield N-p-chlorobenzyl-N'-ethyl piperazine hydrobromide. Another equivalent of hydrobromic acid was added to give the dihydrobromide and this product was catalytically hydrogenated. After filtration from the catalyst and evaporation of the solution in vacuo, mono-N'-ethyl piperazine dihydrobromide was crystallized from alcohol ether.

*Example 3*

Mono-N'-propyl piperazine dihydrochloride was obtained in the process according to Example 2, by using propyl chloride instead of ethyl bromide.

*Example 4*

Piperazine hexahydrate was dissolved in absolute alcohol and an equimolecular amount of alpha-naphthyl-methyl chloride was stirred into the solution. The mono-N-alphamenaphthyl (equals alpha naphthyl-methyl) piperazine was separated as in Example 1.

Subsequently the monosubstituted compound was reacted with butyl chloride to yield N-alpha-naphthyl-methylene-N'-butyl piperazine hydrochloride. On addition of 1 equivalent of hydrochloric acid and removal of the alpha-menaphthyl group by catalytic hydrogenation, mono-N'-butyl piperazine dihydrochloride was crystallized from alcohol ether.

*Example 5*

Anisyl chloride ($CH_3O$ $C_6H_4$ $CH_2Cl$) (1 mol) (from anisyl alcohol ($CH_3OC_6H_4CH_2OH$) and hydrogen chloride) was reacted with piperazine (1 mol) in absolute alcohol solution. The bulk of the dianisyl piperazine formed as a by-product separated towards the end of the reaction as its dihydrochloride and was filtered off. The solvent was evaporated from the filtrate, the residue diluted with water, basified and the anisyl piperazine extracted with ether. The small amount of impurities remaining was separated by vacuum distillation.

The mono-N-anisyl piperazine so produced was reacted in benzene with p-nitrobenzoyl chloride. The resulting compound, N-anisyl-N'-p-nitrobenzoyl piperazine hydrochloride separated and was recrystallized from alcohol. On drastic catalytic hydrogenation in alcoholic solution at room temperature with a platinum catalyst, first the nitro group was reduced to an amino group and thereafter the anisyl group was split off to yield the mono-N'-p-amino-benzoyl piperazine dihydrochloride.

*Example 6*

Fourteen parts by weight of mono-N-benzyl piperazine (Example 1) were reacted in alcoholic solution with five parts by weight of ethylene oxide yielding 17 parts of crude N-benzyl-N'-hydroxyethyl piperazine. This was then benzoylated by the Schotten Baumann method and the product purified by crystallization as the dihydrochloride. This material, N-benzyl-N'-benzoyloxyethyl piperazine dihydrochloride was hydrogenated with hydrogen and palladized charcoal in 80% acetic acid solution yielding toluene and mono-N'-benzoyloxyethyl piperazine dihydrochloride.

*Example 7*

Mono-N-p-chlorobenzyl piperazine as obtained according to Example 2, was treated with a slight excess of phenacyl bromide to yield N-p-chloro-benzyl-N'-phenacyl piperazine. This was catalytically hydrogenated to mono-N'-(beta-phenyl-beta-hydroxyethyl) piperazine.

*Example 8*

Anisyl chloride ($CH_3O$ $C_6H_4$ $CH_2Cl$ (1 mol) (from anisyl alcohol ($CH_3OC_6H_4CH_2OH$) and hydrogen chloride) was reacted with piperazine (1 mol) in absolute alcohol solution. The bulk of the dianisyl piperazine formed as a by-product separated towards the end of the reaction as its dihydrochloride and was filtered off. The solvent was evaporated from the filtrate, the residue diluted with water, basified and the anisyl piperazine extracted with ether. The small amount of impurities remaining was separated by vacuum distillation.

The mono-anisyl piperazine so produced was treated with chloro-acetocatechol forming N-anisyl-N'-(3,4 - dihydroxyphenacyl) piperazine which was isolated as its dihydrochloride. Drastic catalytic hydrogenation of this compound at room temperature with a platinum catalyst yielded mono-N'-(beta - 3,4 - dihydroxyphenyl-beta-hydroxyethyl) piperazine.

Example 9

N-benzyl piperazine as obtained according to Example 1, was dissolved in 95% alcohol and a slight excess of nitrourea was added. The solution was warmed cautiously until evolution of gas had ceased. The solution was then acidified with HCl, evaporated and the product, N-benzyl-N'-carbamido piperazine hydrochloride purified by recrystallization from alcohol-ether mixture.

This product was catalytically hydrogenated in glacial acetic acid to yield mono-N'-carbamido piperazine.

Example 10

The process according to Example 9 was repeated using phenyl isocyanate as a reagent instead of nitro urea. After catalytic hydrogenation mono-N'-phenylcarbamido piperazine was obtained.

Example 11

The process according to Example 9 was repeated using p-toluene-sulfonyl chloride as a reagent. The product obtained from subsequent catalytic hydrogenation was mono-N'-p-toluene-sulfonyl piperazine monohydrochloride.

Example 12

The process according to Example 9 was repeated using p-acetamidobenzene-sulfonyl chloride as a reagent. Catalytic hydrogenation yielded mono-p-acetamidobenzene-sulfonyl piperazine monohydrochloride which was hydrolyzed by hydrochloric acid to give mono-p-aminobenzene sulfonyl piperazine dihydrochloride.

Example 13

N-benzyl piperazine (Example 1) was warmed in dilute alcoholic solution with S-methyl isothiourea sulfate. Methyl mercaptan was evolved and from the solution, on evaporation and addition of acetone, N-benzyl-N'-carbamidino piperazine sulfate crystallized. It was purified by crystallization from aqueous acetone. Upon catalytic reduction, the benzyl group was eliminated and mono-N'-carbamidino piperazine sulfate was obtained.

Any of the mono-substituted compounds according to Examples 1 to 15 may be treated with a suitable agent for introducing on to the free N a desired second substitutent. In this manner a great variety of unsymmetrically disubstituted piperazines can be produced. The following examples may serve as illustrations of said disubstituted compounds and of the methods of preparing the same. They are not intended to limit the scope of the invention.

Example 14

Mono-N'-methyl piperazine as obtained according to Example 1 was treated with chloro-acetocatechol to form N-(3,4-dihydroxyphenacyl)-N'-methyl piperazine which was isolated as its dihydrochloride. This in turn was hydrogenated catalytically at room temperature with a platinum catalyst giving N-(beta-3,4-dihydroxyphenyl-beta-hydroxyethyl) - N' - methyl piperazine.

Example 15

Mono-N'-methyl piperazine as obtained from Example 1 was treated with p-acetamidobenzene-sulfonyl chloride to produce N-p-acetamidobenzene-sulfonyl-N'-methyl piperazine which was hydrolyzed by warm hydrochloric acid to form mono-N-p-aminobenze sulfonyl-N'-methyl piperazine dihydrochloride.

Example 16

Mono-N'-ethyl piperazine as obtained from Example 2 was reacted with ethylene oxide to produce N-hydroxyethyl-N'-ethyl piperazine. This was then benzoylated by the Schotten Baumann method and the product derived by crystallization as the hydrochloride of N-benzoyloxyethyl-N'-ethyl piperazine.

Example 17

Mono-N'-ethyl piperazine as obtained from Example 2 was treated with chloro-acetocatechol to form N-(3,4-dihydroxyphenacyl)-N'-ethyl piperazine which was isolated as its dihydrochloride.

Example 18

Mono-N'-ethyl piperazine as obtained from Example 2 was reacted with p-toluene-sulfonyl chloride to yield N-p-toluene-sulfonyl-N'-ethyl piperazine.

Example 19

Mono-N'-propyl piperazine as obtained from Example 3 was reacted with an equimolecular amount of benzoyl chloride to produce N-benzoyl-N'-propyl piperazine.

Example 20

Mono-N'-propyl piperazine as obtained from Example 3 was reacted with p-acetamido-benzene-sulfonyl chloride to obtain N-p-acetamidobenzene-sulfonyl-N'-propyl piperazine.

Example 21

Mono-N'-butyl piperazine as obtained from Example 4 was treated with a slight excess of phenacyl bromide to yield N-phenacyl-N'-butyl piperazine.

Example 22

7.1 parts by weight of mono-N'-benzoyloxyethyl piperazine dihydrochloride, as obtained from Example 6, were dissolved in 50 parts of water and 2.8 parts of nitro urea and 4.2 parts of sodium bicarbonate were added with stirring and gentle warming. After standing at about 80° C. for ½ hour the solution was evaporated in vacuo and the residue extracted with 90% acetone. The solution was filtered from undissolved solid (mainly sodium chloride) and acidified with hydrochloric acid. The product, N-carbamido-N'-benzoyloxyethyl piperazine hydrochloride, soon crystallized and was purified by recrystallization from aqueous acetone.

Example 23

Mono-N'-carbamido piperazine as obtained from Example 9 was treated with phenacyl bromide to yield N-phenacyl-N'-carbamido piperazine.

Example 24

Mono-N'-(beta-phenyl-beta-hydroxyethyl) piperazine dihydrochloride, as obtained from Example 7, was treated with one equivalent of potassium bicarbonate and one equivalent of potassium thiocyanate to produce N-thiocarbamido-N'-(beta-phenyl-beta-hydroxyethyl) piperazine.

*Example 25*

Mono-N'-benzoyloxyethyl piperazine dihydrochloride, as obtained from Example 6, was dissolved in ice water and the base liberated by careful addition of sodium hydroxide solution. The oily base was extracted with benzene and the extract was dried briefly over potassium carbonate. The solution was then treated with phenyl isothiocyanate to form N-phenylthiocarbamido-N'-benzoyloxyethyl piperazine.

Other applications of our new method will readily occur to those skilled in the art.

We claim:

1. In a method of preparing N-substituted piperazines the steps of treating piperazine with an aralkyl halide having the general formula

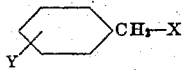

in which X is a halogen and Y is a radical of the group consisting of H and substituents unreactive in the reaction to form a reaction mixture, containing in addition to the unreacted piperazine and the symmetrically di-N-substituted piperazine, a substantial amount of mono-N-aralkyl substituted piperazine, separating the mono-N-aralkyl-substituted piperazine from the unreacted piperazine and from the di-substituted piperazine, introducing the desired substituent on to the second (N') nitrogen atom of the mono-aralkyl substituted piperazine, and then removing the aralkyl group by catalytic hydrogenation.

2. In a method of preparing N-substituted piperazines the steps of treating piperazine with an aralkyl halide having the general formula

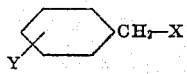

in which X is a halogen and Y is a radical of the group consisting of H and substituents unreactive in the reaction to form a reaction mixture, containing in addition to the unreacted piperazine and the symmetrically di-N-substituted piperazine, a substantial amount of mono-N-aralkyl substituted piperazine, separating the mono-N-aralkyl-substituted piperazine from the unreacted piperazine and from the di-substituted piperazine by fractional distillation, introducing the desired substituent on to the second (N') nitrogen atom of the mono-aralkyl substituted piperazine, and then removing the aralkyl group by catalytic hydrogenation.

3. In a method of preparing N-monosubstituted piperazines the steps of treating piperazine with an aralkyl halide having the general formula

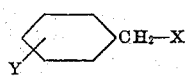

in which X is a halogen and Y is a radical of the group consisting of H and substituents unreactive in the reaction to form a reaction mixture, containing in addition to the unreacted piperazine and the symmetrically di-N-substituted piperazine, a substantial amount of mono-N-aralkyl substituted piperazine, separating the mono-N-aralkyl-substituted piperazine from the unreacted piperazine and from the di-substituted piperazine by fractional distillation, introducing on to the second (N') nitrogen atom of the mono-aralkyl substituted piperazine a substituent selected from the group consisting of the lower alkyls having less than 8 carbon atoms, acyl, aryl sulfonyl, substituted aryl sulfonyl, acyloxyalkyl, hydroxyphenalkyl, carbamido, substituted carbamido and carbamidino, and then removing the aralkyl group by catalytic hydrogenation.

4. A method of preparing unsymmetrically N-disubstituted piperazines comprising the steps of treating piperazine with an aralkyl halide having the general formula

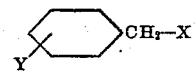

in which X is a halogen and Y is a radical of the group consisting of H and substituents unreactive in the reaction to form a reaction mixture, containing in addition to the unreacted piperazine and the symmetrically di-N-substituted piperazine, a substantial amount of mono-N-aralkyl substituted piperazine, separating the mono-N-aralkyl-substituted piperazine from the unreacted piperazine and from the disubstituted piperazine, introducing one of the desired substituents on to the second (N') nitrogen atom of the mono-N-aralkyl substituted piperazine, removing the aralkyl group by catalytic hydrogenation and introducing a second desired substituent different from said first substituent on to the first (N) nitrogen atom in place of the removed aralkyl.

5. A method of preparing unsymmetrically N-disubstituted piperazines comprising the steps of treating piperazine with an aralkyl halide having the general formula

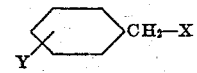

in which X is a halogen and Y is a radical of the group consisting of H and substituents unreactive in the reaction to form a reaction mixture, containing in addition to the unreacted piperazine and the symmetrically di-N-substituted piperazine, a substantial amount of mono-N-aralkyl substituted piperazine, separating the mono-N-aralkyl-substituted piperazine from the unreacted piperazine and from the disubstituted piperazine, introducing on to the second (N') nitrogen atoms of the mono-N-aralkyl substituted piperazine a substituent selected from the group consisting of the lower alkyls having less than 8 carbon atoms, acyl, aryl sulfonyl, substituted aryl sulfonyl, acyloxyalkyl and hydroxyphenalkyl, removing the aralkyl group by catalytic hydrogenation and introducing on to the first (N) nitrogen atom in place of the removed aralkyl a second desired substituent different from said first substituent, said second substituent being selected from the group consisting of the lower alkyls having less than 6 carbon atoms, acyl, aryl sulfonyl, substituted aryl sulfonyl, acyoxyalkyl, phenacyl, substituted phenacyl, hydroxyphenacyl, carbamido, substituted carbamido, thiocarbamido, substituted thiocarbamido, and carbamidino.

6. A method of preparing N-carbamido-N'-benzoyl-oxyethyl piperazine comprising the steps of dissolving piperazine hexahydrate in absolute ethanol, adding benzyl cholride, distilling off the alcohol, extracting the reacted piperazine with ether, distilling in vacuo to separate mono-N-benzyl piperazine from dibenzyl piperazine, reacting the mono-N-benzyl piperazine with ethylene oxide to form N-benzyl-N'-hydroxyethyl piperazine, benzoylating to N-benzyl-N'-benzoyloxyethyl piperazine dihydrochloride, hydrogenating with palladized charcoal in acetic acid to eliminate the benzyl group, treating the mono-N'-benzoyloxyethyl piperazine hydrochloride obtained in aqueous solution with nitro urea and sodium bicarbonate, evaporating in vacuo and acidifying with hydrochloric acid to form crystalline N-carbamido-N'-benzoyloxyethyl piperazine hydrochloride.

7. A method of preparing N-thiocarbamido-N'-(beta-phenyl-beta-hydroxy ethyl) piperazine comprising the steps of dissolving piperazine in absolute ethanol, adding benzyl chloride, distilling off the alcohol, extracting the reacted piperazine with ether, distilling in vacuo to separate mono-N-benzyl piperazine from dibenzyl piperazine, reacting the mono-N-benzyl piperazine in alcohol solution with phenacyl bromide to form N-benzyl-N'-phenacyl piperazine, acidifying this with hydrochloric acid and hydrogenating it catalytically to remove the benzyl group and reduce the keto group so as to yield mono-N'-(beta-phenyl-beta-hydroxyethyl) piperazine, treating this product in alcohol solution with potassium thiocyanate and potassium bicarbonate in equivalent quantities and crystallizing the product, N-thiocarbamido-N'-(beta - phenyl - beta - hydroxy ethyl) piperazine as its dihydrochloride.

8. N-carbamido-N'-benzoyloxyethyl piperazine.

9. An unsymmetrical N—R—N'—R' piperazine, where R is an acyloxyalkyl and R' represents a radical selected from the group consisting of hydrogen, carbamido, substituted carbamido, thiocarbamido, substituted thiocarbamido and $$\begin{matrix} \text{NH} \\ \| \\ -\text{C}-\text{NH}_2 \end{matrix}$$

JOHANNES S. BUCK.
RICHARD BALTZLY.

REFERENCES CITED

The following references are of record in the file of this patent:

FOREIGN PATENTS

| Number | Country | Date |
|--------|---------|------|
| 698,687 | French | Feb. 3, 1931 |

OTHER REFERENCES

Journal Chem. Soc. (London), vol. 105, pages 221–2, 1914.

Journal Chem. Soc. (London), pages 39–49, 1929.

Beilstein, vol. XXIII, pages 5, 9, 11.

Berichte, vol. 66, pages 113–115.

Chem. Abstracts, 1930, pages 2749–2751 citing: Bull. Soc. Chim. (4), vol. 45, pages 1172–1189, 1929.

Chem. Abstracts, 1938, page 942, citing: Journal Amer. Chem. Soc., vol. 59, pages 2570–2, 1937.